United States Patent [19]

Houlihan et al.

[11] 3,870,751

[45] Mar. 11, 1975

[54] SUBSTITUTED PHENYL ACETIC ACIDS

[75] Inventors: William J. Houlihan, Mountain Lakes; Jeffrey Nadelson, Lake Parsippany, both of N.J.

[73] Assignee: Sandoz-Wander, Inc., Hanover, N.J.

[22] Filed: Feb. 20, 1973

[21] Appl. No.: 333,894

[52] U.S. Cl.... 260/515 R, 204/158 HA, 260/465 R, 260/465 F, 260/465 G, 260/515 A, 260/521, 260/592, 424/317

[51] Int. Cl............................................ C07c 63/60

[58] Field of Search............ 260/515 R, 515 A, 521

[56] References Cited

UNITED STATES PATENTS 3,073,862  1/1963  Abramo et al.................... 260/558

*Primary Examiner*—James A. Patten
*Attorney, Agent, or Firm*—Gerald D. Sharkin; Robert S. Honor

[57] ABSTRACT

Substituted phenyl acetic acids e.g. p-(1-t-butyl vinyl) phenyl acetic acids are prepared by dehydrating corresponding (p-pivaloyl phenyl) acetic acids and are useful as hypolipidemic agents.

5 Claims, No Drawings

SUBSTITUTED PHENYL ACETIC ACIDS

This invention relates to substituted phenyl acetic acids which exhibit hypolipidemic activity. In particular, it relates to said phenyl acetic acids, pharmaceutically acceptable salts, their preparation and intermediates thereof.

The compounds of this invention may be represented by the formula

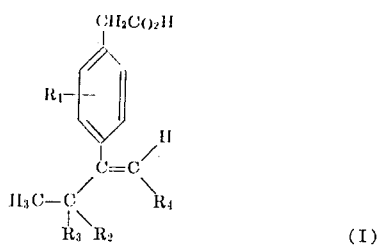

(I)

where
R₁ represents hydrogen, halo having an atomic weight of about 19 to 36, or straight chain alkoxy, i.e., straight alkoxy having one to four carbon atoms, e.g., methoxy, ethoxy, isopropoxy and the like, and R₂ and R₃ each independently represent lower alkyl having one to two carbon atoms i.e., methyl or ethyl, and R₄ is hydrogen, or lower alkyl having one to three carbon atoms.

The compounds of formula I are prepared according to the following reaction scheme:

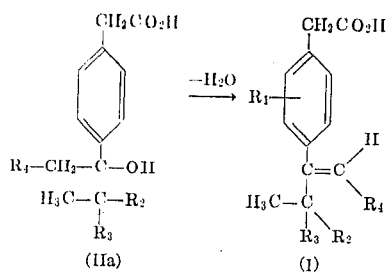

where
R₁, R₂, R₃ and R₄ are as defined above.

The compounds of formula (I) are prepared by dehydrating a compound of the formula (IIa) with a strong acid in a catalytic amount in the presence of an inert organic solvent. Suitable acids which may be employed include, sulfuric acid, hydrochloric acid or p-toluene sulfonic acid, the latter being especially preferred. The reaction is carried out in the presence of an inert organic solvent, such as the aromatic hydrocarbons, e.g., benzene, toluene, xylene and the like, preferably toluene. The temperature of the reaction is not critical, but it is preferred that the reaction be carried out between 60° and 180°C, especially the reflux temperature of the solvent. The reaction is run from about 12 to 48 hours, preferably from about 20 to 25 hours. The product is recovered using conventional techniques e.g., crystallization.

The compounds of formula (IIa) are prepared according to the following reaction scheme:

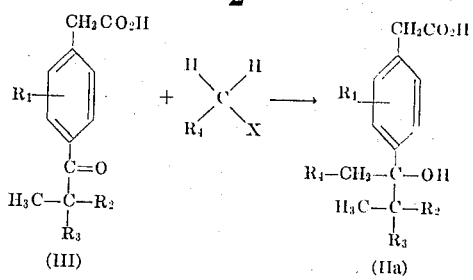

where
X represents magnesium or lithium, and
R₁, R₂, R₃ and R₄ are as defined above.

The compounds of formula (IIa) are prepared by reducing a compound of the formula (III) with a metal alkyl such as methyl lithium, butyl lithium, di-butyl magnesium or di-propyl magnesium, preferably methyl lithium. The reaction is carried out in the presence of an inert organic solvent such as ethers, e.g., diethyl ether or tetrahydrofuran, the latter being especially preferred. Although the temperature of the reaction is not critical, it is preferred that the reaction be run from about −10° to 10°C, especially 0°C. The reaction is run from about 1 to 6 hours, preferably about 2.5 to 3.5 hours. The compounds of formula (IIa) are recovered by conventional techniques e.g., crystallization.

Another aspect of this invention is the preparation of the compounds of formula (IIb) which are prepared according to the following reaction scheme:

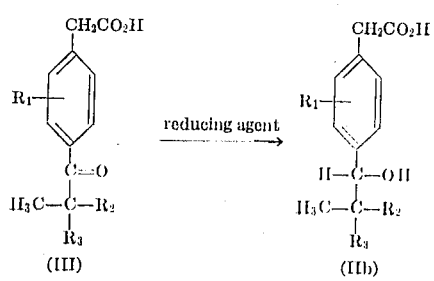

where
R₁, R₂ and R₃ are as defined above.

The compounds of formula (IIb) are prepared by reducing a compound of the formula (III) with an alkali metal hydride such as sodium borohydride, lithium borohydride, sodium aluminum hydride or lithium aluminum hydride, preferably sodium borohydride. An aqueous solvent may be employed such as water or a mixture of water and a water soluble organic solvent e.g., lower alkanols having one to four carbon atoms e.g., methanol, ethanol, and the like. The temperature of the reaction is critical, and it is preferred that the reaction be carried out from about 10° to 35°C, especially room temperature. The reaction is run from about 1 to 6 hours, preferably about 2.5 to 3.5 hours. The compounds of formula (IIb) are recovered using conventional techniques e.g., filtration.

The compounds of formula (III) are prepared according to the following reaction scheme:

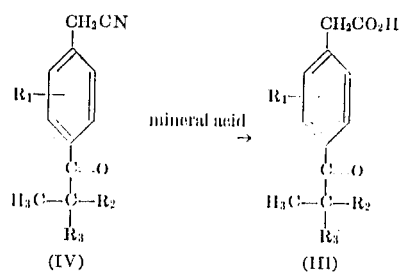

where

R₁, R₂ and R₃ are as defined above.

The compounds of formula (III) are prepared by hydrolysing compounds of formula (IV) with aqueous mineral acids. When R₁ is hydrogen or halo, it is preferred that concentrated mineral acid be used. When R₁ is lower alkoxy, it is preferred that a dilute mineral acid be employed. The acid can be hydrochloric acid, sulfuric acid, phosphoric acid and the like. The particular acid used is not critical but hydrochloric acid is preferred. The aqueous solvent can be water or a mixture of water and a water soluble organic solvent, e.g., the lower alkanols. The preferred solvent is water, although the particular solvent used is not critical. The temperature of the reaction is also not critical, but it is preferred that the reaction be carried out at the reflux temperature of the solvent. The reaction is run for about 12 to 72 hours, preferably about 40 to 50 hours. The product is recovered by conventional techniques e.g., recrystallization.

The compounds of formula (IV) are prepared according to the following reaction scheme:

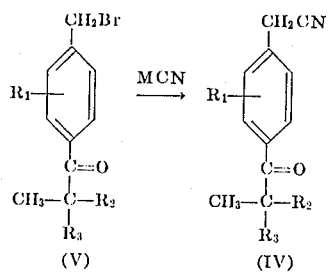

where

M represents an alkali metal, preferably sodium or potassium and R₁, R₂ and R₃ are as set out above.

The compounds of formula (IV) are prepared by treating compounds of formula (V) with an alkali metal cyanide such as cyanide, potassium cyanide, and the like, preferably potassium cyanide, in the presence of an aqueous organic solvent. The preferred solvents are the aqueous-lower alkanols such as methanol, ethanol and the like, and water-dioxane, although anhydrous dimethylsulfoxide can also be employed. The temperature of the reaction is not critical but it is preferred that the process be carried out at a temperature between about 40° to 120°C, especially the reflux temperature of the system. The reaction is run for about 1–10 hours; preferably about 3 to 5 hours. The product is recovered by conventional techniques, e.g., evaporation.

The compounds of formula (V) are prepared according to the following reaction scheme:

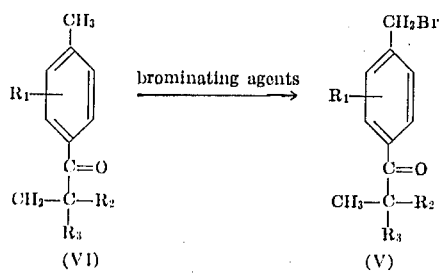

where

R₁, R₂ and R₃ are as set out above.

The compounds of formula (V) are prepared by treating a compound of formula (VI) with a brominating agent in the presence of an inert organic solvent and free radical initiator. The brominating agent which can be used is bromine, N-bromosuccinimide, N-bromo phthalamide, N-bromo-acetamide and the like. The particular agent used is not critical, but N-bromosuccinamide is preferred. In the preferred process, the free radical initiator used is an organic or inorganic peroxide, especially benzoyl peroxide. The reaction can also be carried out under ultraviolet light. Although the particular solvent used is not critical, the preferred solvents are the halogenated hydrocarbons such as methylene dichloride, chloroform, carbon tetrachloride and the like, although the aromatic hydrocarbons such as benzene can also be employed. The temperature of the reaction is not critical, but reflux temperature of the solvent is preferred. The reaction is run for about 12 to 48 hours; preferably about 18 to 25 hours. The product is recovered by conventional techniques e.g., crystallization.

Many of the compounds of formula VI are known and may be prepared by methods described in the literature. The compounds of formula VI not specifically disclosed may be prepared by analogous methods from known starting materials.

It will be understood that certain of the compounds of the formula (I) which R₄ is not hydrogen can exist in the form of cis-trans isomers. The separation and recovery of the respective isomers may be readily accomplished employing conventional techniques and such cis-trans isomers are included within the scope of this invention.

It will also be understood that certain of the compounds of formula (IIb) in which R₂ and R₃ are not the same may exist in the form of optically active isomers. The separation and recovery of the respective isomers may be readily accomplished employing conventional techniques and such isomers are included within the scope of this invention.

The compounds of formula (I) and (IIb) are useful because they possess pharmacological activity in animals, as hypolipidemic agents, particularly as hyperlipoproteinemic agents as indicated by the fall in cholesterol and triglyceride levels in the male albino Wistar rats weighting 110–130 g. initially. The rats are maintained on drug-free laboratory chow diet for seven days and then divided into groups of 8 to 10 animals. Each group with the exception of the control is then given orally 30 milligrams per kilogram of body weight per diem of the compound for 6 days. At the end of this period, the animals are anesthetized with sodium hexobarbital and bled from the carotid arteries. Serum or plasma samples are collected, and 1.0 ml samples of the serum are added to 9.0 ml redistilled isopropanol. Two autoanalyzer cupsful of a mixture of zeolite-copper hydroxide and Lloydds reagent (Kessler, G., and Lederer, H., 1965, Technicon Symposium, Mediad Inc., New York, (345–347) are added, and the mixture is shaken for 1 hour. Cholesterol and triglyceride levels are determined simultaneously on the same sample by Technicon N24 A (cholesterol) and N-78 (triglyceride) methodology. The mean total serum cholesterol levels are then computed and the hypocholesterolemic activity is expressed as the fall in cholesterol levels as a percentage of the control level. The change in serum triglyceride levels induced by the drug is computed as a percentage of the control triglyceride levels.

For such usage, the compounds (I) and (IIb) may be combined with a pharmaceutically acceptable carrier or adjuvant and may be administered orally or parenterally as such or admixed with conventional pharmaceutical carriers. They may be administered in such forms as tablets, dispersible powders, granules, capsules, syrups and elixirs and parenterally as solutions, suspensions, dispersions, emulsions and the like, e.g., a sterile injectable aqueous solution. The dosage will vary depending upon the mode of administration utilized and the particular compound employed.

The compounds of formulae (I) and (IIb) may be similarly administered in the form of their non-toxic pharmaceutically acceptable salts. Such salts possess the same order of activity as the free acid, and are readily prepared by reacting the base with an appropriate hydroxide or oxide and, accordingly, are included within the scope of this invention. Representative of such salts are the alkali metal salts, e.g., sodium, potassium and the like, and alkaline earth metal salts such as magnesium, calcium and the like.

The hypolipidemic effective dosage of compounds (I) and (IIb) employed in the alleviation of lipidemia may vary depending on the particular compound employed and the severity of the condition being treated. However, in general, satisfactory results are obtained when the compounds of formula (I) and (IIb) are administered at a daily dosage of from about 2.0 milligrams to about 250 milligrams per kilogram of animal body weight, preferably given in divided doses two to four times a day, or in sustained release form. For most large mammals, the total daily dosage is from about 150 milligrams to about 2000 milligrams. Dosage forms suitable for internal use comprise from about 35 to about 1000 milligrams of the active compound in intimate admixture with a solid or liquid pharmaceutically acceptable carrier or diluent.

A representative formulation suitable for oral administration 2 to 4 times a day for the treatment of lipidemia is a capsule prepared by standard encapsulating techniques which contains the following:

| Ingredients | Weight (mg) |
| --- | --- |
| p-(1-t-butylvinyl) phenyl acetic acid | 150 |
| inert solid diluent (starch, lactose, kaolin). | 300 |

EXAMPLE I

α-bromo-p-pivaloyl toluene.

To a suspension of 28.5 g (1.17 g. atoms) magnesium turnings in 150 ml tetrahydrofuran under a nitrogen atmosphere there is added 10 ml of 4-bromotoluene 1.17 mole in 650 ml dry tetrahydrofuran, the reaction is started and the remainder of the bromotoluene solution is added dropwise at a rate that maintains a moderate reflux. After the addition is complete, the mixture is refluxed for an additional 1½ hours. The resulting Grignard solution is added dropwise to a cold solution of 128.0 g pivaloyl chloride (1.06 mole) in 500 ml dry tetrahydrofuran at a rate that maintains the temperature at 0° to −5°C. The solution is stirred for an additional 1½ hours at 0° and then at room temperature for 18 hours. The mixture is then cooled to 0° and hydrolyzed by the addition of 100 ml 2N hydrochloric acid. The layers are separated and 200 ml of ether is added to the organic phases which is then washed respectively with 100 ml 2N hydrochloric acid, 100 ml. 10 percent sodium bicarbonate solution and 100 ml saturated sodium chloride. The resulting layer is dried over anhydrous sodium sulfate, filtered, and the solvent is removed in vacuo to give p-pivaloyl toluene (b.p. 80°-84°C/0.7 mm,$n_D^{21}$ 1.5108). A mixture of 156.3 g. (0.886 mole) of the resulting p-pivaloyl toluene is then added to 157.8 g (0.886 mole) N-bromosuccinimide, 4.0 g (0.016 mole) benzoyl peroxide and 150 ml carbon tetrachloride and heated at reflux for 18 hours. The mixture is cooled and filtered and the resulting precipitate is washed with carbon tetrachloride. The solvents are removed in vacuo and the resulting oil is distilled in vacuo to give α-bromo-p-pivaloyl toluene (b.p. 124° − 132°/0.7 mm, $n_D^{22}$ 1.5546–V.P.C. 96 percent monobromo 4 percent-Dibromo).

Following the above procedure and using in place of 4-bromo-toluene equivalent amounts of:
 a. 4-bromo-2-chlorotoluene or
 b. 4-bromo-2-methoxytoluene,
there is obtained
 a. α-bromo-2-chloro-4-pivaloyl toluene or
 b. α-bromo-2-methoxy-4-pivaloyl toluene; respectively.

EXAMPLE II p-pivaloyl phenyl acetonitrile

A solution of 34.3 g (0.700 mole) sodium cyanide in 40 ml of water is warmed to 50°C and a solution of α-bromo-p-pivaloyl toluene in 85 ml ethanol is then added dropwise at such a rate as to maintain the temperature at 50°C. After the addition is complete, the mixture is refluxed for 4 hours. The excess ethanol is removed in vacuo and the resulting residue is treated with ether/water. The layers are separated and the ether is washed with cold 50 percent sulfuric acid, water and sodium bicarbonate, then the ether layer is dried over anhydrous magnesium sulfate, filtered and evaporated in vacuo. The residue is distilled in vacuo to give p-pivaloyl phenyl acetonitrile (b.p. 143°–148°C/0.75 mm $n_D^{22}$ 1.5244.)

Following the above procedure and using in place of α-bromo-p-pivaloyl toluene an equivalent amount of
 a. α-bromo-2-chloro-4-pivaloyl toluene, or
 b. α-bromo-2-methoxy-4-pivaloyl toluene,
there is obtained
 a. 2-chloro-4-pivaloyl phenyl acetonitrile, or
 b. 2-methoxy-4-pivaloyl phenyl acetonitrile, respectively.

EXAMPLE III p-pivaloyl phenyl acetic acid.

To a flask equipped with a stirrer, dropping funnel and condenser there is added 50.0 g (0.25 mole) p-pivaloyl phenyl acetonitrile to 1 liter concentrated hydrochloric acid which is then refluxed for 48 hours. The resultant precipitate is filtered, dissolved in chloroform, and washed with 2N sodium hydroxide. The basic aqueous phase is separated from the organic phase, cooled and acidified with concentrated hydrochloric acid and the resulting solid is then recrystallized from hot benzene to give p-pivaloyl phenyl acetic acid, m.p. (111°-112°C).

Following the above procedure and using in place of p-pivaloyl phenyl acetonitrile an equivalent amount of
 a. 2-chloro-4-pivaloyl acetonitrile,
there is obtained.

a. 2-chloro-4-pivaloyl phenyl acetic acid.

Again following the above procedure and using in place of p-pivaloyl phenyl acetonitrile an equivalent amount of 2-methoxy-4-pivaloyl phenyl acetonitrile in the presence of a dilute hydrochloric acid in place of concentrated hydrochloric there is obtained 2-methoxy-4-pivaloyl phenyl acetic acid.

EXAMPLE IV p-(2,2-dimethyl-3-hydroxypropyl) phenyl acetic acid.

To a solution of 6.6 g (0.03 mole) p-pivaloyl phenyl acetic acid in 75 ml of water containing 1.2 g (0.03 mole) sodium hydroxide, there is added to 0.57 g (0.015 mole) sodium borohydride in portions. The resulting mixture is stirred for 3 hours at room temperature, cooled with ice and then treated with 2N hydrochloric acid dropwise until the resulting mixture is made strongly acidic to litmus. The mixture is filtered and the solid washed with water, dissolved in ether. The excess ether is washed with saturated ammonium chloride, dried over anhydrous magnesium sulfate, filtered and evaporated to five p-(2,2-dimethyl-3-hydroxy propyl) phenyl acetic acid; m.p. 144° – 146°C.

Following the above procedure and using in place of p-pivaloyl phenyl acetic acid an equivalent amount of
a. 2-chloro-4-pivaloyl phenyl acetic acid or
b. 2-methoxy-4-pivaloyl phenyl acetic acid
there is obtained
a. 4-(2,2-dimethyl-3-hydroxypropyl) 2-chlorophenyl acetic acid, or
b. 4-(2,2-dimethyl-3-hydroxypropyl)-2-methoxyphenyl acetic acid, respectively.

EXAMPLE V p-(1-t-butylvinyl)phenyl acetic acid.

To a solution of 11.0 g (0.05 mole) of p-pivaloyl phenyl acetic acid in 110 ml of dry tetrahydrofuran cooled to 0°C, there is added dropwise 73 ml of 1.5 m methyl lithium (0.11 mole) in ether, maintaining temperature between 0° and 5°C. After the addition stirring is initiated for 3 hours at 0°C and quenched by the addition dropwise of saturated ammonium chloride. The phases are separated and the organic phase dried and evaporated to give p-(3,3-dimethyl-2-hydroxybutyl) phenyl acetic acid. The resulting residue is dissolved in 65 ml of toluene containing a catalytic amount of p-toluenesulfonic acid. The mixture is refluxed for 24 hours and cooled. Ether is then added and the mixture extracted with 2N sodium hydroxide. The basic layer is acidified at 0°C with concentrated hydrochloric acid, and extracted with ether. The excess is dried and evaporated in vacuo and the crystalline residue is recrystallized from petroleum ether to give p-(1-t-butylvinyl)phenyl acetic acid; m.p. 78° – 80°C.

Following the above procedure and using in place of p-pivaloyl phenyl acetic acid an equivalent amount of
a. 2-chloro-4-pivaloyl phenyl acetic acid, or
b. 2-chloro-4-pivaloyl phenyl acetic acid
there is obtained
a. 4-(1-t-butyl vinyl)-2-chlorophenyl acetic acid, or
b. 4-(1-t-butyl vinyl)-2-methoxyphenyl acetic acid, respectively.

Again following the above procedure and using in place of methyl lithium an equivalent amount of ethyl lithium there is obtained
c. p-(3-[4,4-dimethyl-2-pentenyl]) phenyl acetic acid.

The p-(1-t-butylvinyl)phenyl acetic acid of this example is an effective hypolipidemic agent when orally administered to an animal suffering from lipidemia at a dosage of 150 mg 4 times per day.

What is claimed is:

1. A compound of the formula

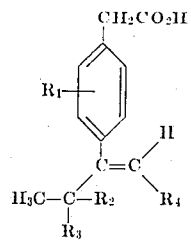

where,
R$_1$ represents hydrogen, halo having an atomic weight of about 19 to 36 or straight chain lower alkoxy and
R$_2$ and R$_3$ each independently represent alkyl having one or two carbon atoms, and
R$_4$ represents hydrogen, or lower alkyl or a pharmaceutically acceptable salt thereof.

2. A compound of the formula

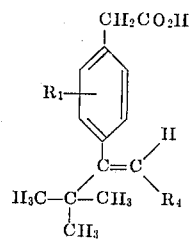

where
R$_1$ and R$_4$ are as defined in claim 1, or a pharmaceutically acceptable salt thereof.

3. A compound of the formula

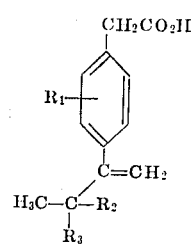

where
R$_1$, R$_2$ and R$_3$ are as defined in claim 1, or a pharmaceutically acceptable salt thereof.

4. A compound of the formula

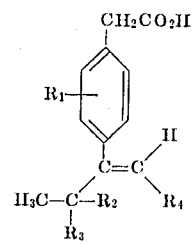

where
R$_1$, R$_2$, R$_3$ and R$_4$ are as defined in claim 1, or a pharmaceutically acceptable salt thereof.

5. The compound of claim 1 which is p-(1-t-butyl vinyl) phenyl acetic acid.

* * * * *